United States Patent [19]

Nagaura et al.

[11] Patent Number: 5,587,994
[45] Date of Patent: Dec. 24, 1996

[54] CARTRIDGE USED FOR A DISC-SHAPED RECORDING MEDIUM

[75] Inventors: Toshikazu Nagaura, Nara; Zenjiro Yamashita, Yamatokoriyama; Kazuhiko Arikawa, Yamabe-gun; Kenji Ohta, Kitakatsuragi-gun, all of Japan

[73] Assignee: Sharp Kabushiki Kaisha, Osaka, Japan

[21] Appl. No.: 321,451

[22] Filed: Oct. 11, 1994

Related U.S. Application Data

[63] Continuation of Ser. No. 63,950, May 20, 1993, abandoned.

[30] Foreign Application Priority Data

Jun. 3, 1992 [JP] Japan ................................ 4-142732

[51] Int. Cl.⁶ ............................ G11B 17/03; G11B 23/00
[52] U.S. Cl. ................................ 369/291; 360/133
[58] Field of Search .......................... 369/280, 282, 369/290, 291, 270, 271, 289, 77.2; 360/132, 133; 206/309, 444

[56] References Cited

U.S. PATENT DOCUMENTS

| | | | |
|---|---|---|---|
| 4,078,246 | 3/1978 | Berthoux et al. | 360/133 |
| 4,194,228 | 3/1980 | Duff | 360/133 |
| 4,471,397 | 9/1984 | Cloutier | 360/133 |
| 4,477,894 | 10/1984 | Clurman | 369/270 |
| 4,583,133 | 4/1986 | Shoji et al. | 360/69 |
| 4,654,733 | 3/1987 | Kawakami et al. | 360/133 X |
| 4,675,762 | 6/1987 | Noda et al. | 360/97 |
| 4,733,388 | 3/1988 | Fujimoto et al. | 369/270 |
| 4,739,434 | 4/1988 | Iizuka et al. | 360/133 |
| 4,847,826 | 7/1989 | Sakaguchi et al. | 369/270 |
| 5,090,010 | 2/1992 | Takahashi | 369/291 |
| 5,111,446 | 5/1992 | Fujita | 369/291 |
| 5,315,470 | 5/1994 | Fujino et al. | 360/133 |

FOREIGN PATENT DOCUMENTS

| | | | |
|---|---|---|---|
| 0510681 | 10/1992 | European Pat. Off. . | |
| 0516329 | 12/1992 | European Pat. Off. . | |
| 2082372 | 3/1982 | United Kingdom | 360/133 |
| 2161977 | 1/1986 | United Kingdom | 360/133 |

OTHER PUBLICATIONS

Henderson, "Flexible Disk Cartridge Arrangement," IBM TDB, vol. 24, No. 1A, Jun. 1981, p. 216.

*Primary Examiner*—Stuart S. Levy
*Assistant Examiner*—William J. Klimowicz

[57] ABSTRACT

A cartridge provided with a case for housing an optical disk so that it can be driven and rotated. A recessed section is formed around the peripheral edge of the center hole of the optical disk. A hub, which is used for clamping the optical disk by the use of a magnetic force, is formed into a hat-shape, and it is placed at the recessed section. The height of the hub is set to be greater than the gap between the optical disk and the cartridge case. Without the necessity of fixing the hub to the disk, this arrangement makes it possible to prevent the hub from coming off from the recessed section. Thus, the arrangement eliminates the fixing process between the hub and the optical disk as well as maintaining the clamping function of the hub, thereby making it possible to reduce the manufacturing cost.

22 Claims, 2 Drawing Sheets

CARTRIDGE USED FOR A DISC-SHAPED RECORDING MEDIUM

This application is a continuation of application Ser. No. 08/063,950 filed on May 20, 1993, now abandoned.

FIELD OF THE INVENTION

The present invention relates to a cartridge used for a disc-shaped recording medium, which houses a disc-shaped recording medium such as an optical disk.

BACKGROUND OF THE INVENTION

As to methods for driving and rotating an optical disk by the use of a driver (player), it is known in the art that regarding compact disks (hereinafter, referred to as CDs), a CD is taken out of a case, and after placing it on the turntable of a driver, the CD is mechanically clamped to the turntable by the disk holder, and rotated.

In contrast, regarding optical disks of write-once type (hereinafter, referred to as WO disks) and magneto-optical disks of rewritable type (hereinafter, referred to as MO disks), the disk is inserted into a driver together with its cartridge, and rotated.

More specifically, in the driver, the WO disk or MO disk is drawn and clamped onto the turntable by a magnetic force, which is exerted to a hub attached to the disk, and rotated thereon.

In comparison with CDs, WO disks and MO disks have the advantage that they are protected against scratches and dust since they are kept in the cartridge. Further, WO disks and MO disks have better operability when placed onto and removed from the driver since they are inserted therein together with the cartridge.

Here, the hub attached to the disk has two functions: one for minimizing the eccentricity that occurs between guide grooves formed on the WO disk or MO disk and the rotation center of the turntable; and the other for permitting the WO disk or MO disk to be drawn into position by the magnet installed on the turntable. The guide grooves are provided for allowing the quick-random-access of information on the information area of the WO disk or MO disk. They are formed on the information area in a spiral shape with their center virtually concentric with the rotational axis of the WO disk or the MO disk.

Meanwhile, optical disks of another type, that is, MDs, are shown in a DCC-MD guide book (written by Kinya Murata, Dempa Publications Inc.). Here, DCC refers to Digital Compact Cassette, and MD refers to Mini Disk. As with the WO and MO, the MD is provided with a cartridge for housing an optical disk so as to protect it from scratches and dust.

As illustrated in FIG. 4, in the MD, an optical disk 11, which functions as a recording medium of the magneto-optical method, is housed in a cartridge 12. In the cartridge 12, a hub 13 for clamping the optical disk 11 onto a turntable, not shown, is installed.

Further, a pair of ring-shaped raised portions 14 are formed facing each other inside the cartridge 12. Each raised portion 14 is designed to contact the non-information area of the optical disk 11. Thus, each raised portion 14 protects the information area of the magneto-optical disk 11 from contacting the cartridge case 12, thereby preventing the information area from being damaged.

The hub 13, which is formed to have a plate-shape, is made of a magnetic substance so as to be attracted by the magnet. The only function imparted to the hub 13 is to clamp the optical disk 11 onto the turntable, not shown, by using the magnetic force; therefore, it is not necessary to provide a precise positioning operation such as needed in the WO disk and the MO disk.

Accordingly, as to the positioning operation between the guide grooves and the rotation center of the turntable, it is provided by fitting a center hole 11a to a flattened-cone-shaped projecting portion that is formed on the turntable, which is the same operation as in the CD.

In this arrangement, if the cartridge 12 is vertically placed, or if it is placed upside down, in the case where the hub 13 is not joined to the optical disk 11, the hub 13 tends to come out from the center hole 11a. When this happens, the optical disk 11 might not remain clamped onto the turntable, or the hub 13 might hit against the cartridge 12 upon rotation of the optical disk 11. This results in a drawback wherein the rotation of the optical disk 11 becomes unstable.

In order to eliminate the drawback, there has been suggested an arrangement wherein the hub 13 is fixed along the periphery of the center hole 11a so as to cover the center hole 11a of the optical disk 11. In order to fix the hub 13 along the periphery of the center hole 11a, such methods as using an adhesive or a double-sided adhesive tape have been adopted. Using such methods makes it possible to reduce the manufacturing cost in comparison with the case of the above-mentioned WO disk or MO disk, since no precise positioning mechanism is required. But even such methods result in increased cost since a special fixing device and bonding materials such as adhesives or double-sided adhesive tapes are required.

SUMMARY OF THE INVENTION

It is an object of the present invention to provide a cartridge used for a disc-shaped recording medium wherein the clamping function of the hub on the disc-shaped recording medium is maintained without fixing the hub to the disc-shaped recording medium; also, cost reduction is achieved by eliminating the fixing device and the bonding materials previously utilized to fix the hub to the disc-shaped recording medium.

In order to achieve the above objective, the cartridge used for the disc-shaped recording medium of the present invention is provided with: a rotationally-driven recording medium which is of a disc-shape with a recessed section; a clamping plate, which is placed at the recessed section, for clamping the disc-shaped recording medium by the use of a magnetic force; and a case for housing the disc-shaped recording medium and the clamping plate so as to permit them to freely rotate. The clamping plate has a height dimension (in the rotational-axis direction of the recording medium) that is set to be greater than the distance between the recording medium and the inner surface of the case.

If the case is vertically placed, or if it is placed upside down, the clamping plate tends to move inside the recessed section and come into contact with the case. However, even in such a situation, the above arrangement allows the clamping plate to remain in the recessed section because the height dimension in the rotational-axis direction of the clamping plate is greater than the distance between the recording medium and the inner surface of the case.

Therefore, even if the case is placed incorrectly (for example, in a position different from the normal-use horizontal position), that is, in a tilted position or upside down, it is possible to prevent the drawback wherein the clamping plate might come out from the recessed section and intrude between the case and the recording medium.

Further, when the case is returned to the normal-use position, the clamping plate is maintained at a predetermined position inside the recessed section. Thus, upon inserting the case into the driver, this arrangement ensures a secure clamping of the recording medium onto the turntable of the driver.

In accordance with the above arrangement, the assembly of the cartridge is simplified: the clamping plate need not be fixed to the recording medium; and after inserting the clamping plate into the recessed section formed in the recording medium, the cartridge is assembled by putting the recording medium into the case. With this arrangement, it is possible to eliminate a special device for joining the clamping plate to the recording medium and the bonding materials such as adhesives that are needed in the conventional methods. Manufacturing cost can, thus, be reduced.

Moreover, another arrangement may be adopted: the clamping plate is formed into a hat shape having a brim portion, and the brim portion is inserted into and brought into contact with the recessed section. A restricting protrusion is formed on the inner surface of the case in a manner as to protrude toward the clamping plate. Here, the distance between the restricting protrusion and the clamping plate is set to be smaller than the depth dimension of the recessed section.

Still another arrangement may be adopted: a stopping member is formed on the inner surface of the case that faces the clamping plate, in the rotational-axis direction of the recording medium, and an engagement hole may be provided in the clamping plate so that the stopping member comes to fit it when the clamping plate moves inside the recessed section.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

Figure 1:
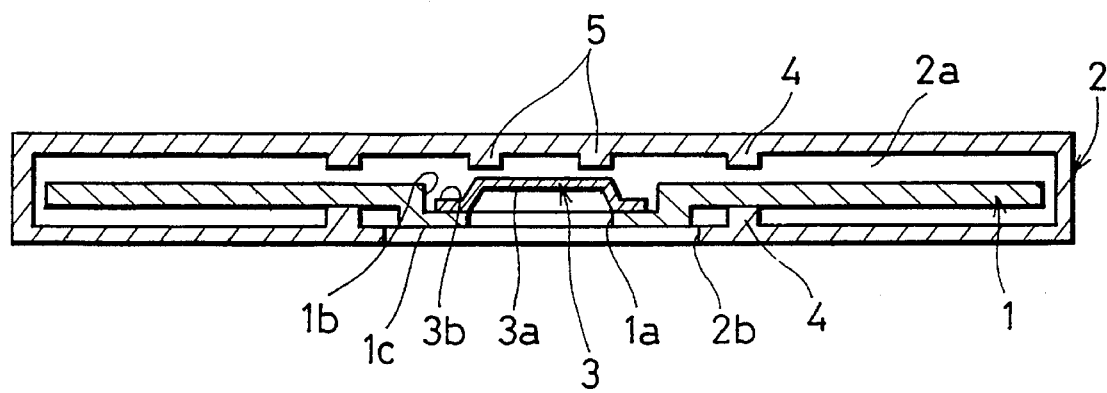
FIG. 1 is a cross-sectional view of a cartridge used for a disc-shaped recording medium that indicates one embodiment of the present invention.

The following description will discuss one embodiment of the present invention as Embodiment 1. As illustrated in FIG. 1, a cartridge used for a disc-shaped recording medium is provided with a cartridge case 2 for housing an optical disk 1 as a disc-shaped recording medium. Here, a recording medium such as a mini-disk is exemplified as the optical disk 1.

The optical disk 1, which is formed into a disk-shape using a resin, such as polycarbonate having superior dimensional stability, as a substrate, is provided with a circular center hole 1a that is coaxial with the rotational-axis of the optical disk 1. The circular center hole 1a fits the raised section of a turntable, not shown, so that the optical disk 1 is driven to rotate.

Further, the optical disk 1 has an information area on one side thereof, on and from which information is recorded and reproduced. The information area includes a lead-in area, a U-TOC (User's Table Of Contents) area, a program area and a lead-out area in this order from its inner side.

The lead-in area, which is exclusively used for reproduction, is provided with land sections and pit sections on its surface, and information is reproduced by the use of those land sections and pit sections. The U-TOC area, the program area and the lead-out area are respectively provided with guiding grooves (pre-grooves), and recording and reproduction are thus available thereon and therefrom through the magneto-optical recording method.

The guiding grooves, which are formed for providing quick random-access, has a spiral shape extending from inside toward outside that is virtually coaxial with the rotational-axis of the optical disk 1.

The cartridge case 2, which is shaped into a rectangular parallelopiped box made of plastic, is provided with a space 2a for housing the optical disk 1 so as to allow it to freely rotate therein and a through hole 2b through which the turntable (not shown) penetrates so as to rotate freely.

Inside the cartridge case 2, is installed a hub 3 for clamping the optical disk 1 onto the turntable (not shown) by the use of a magnetic force. The hub 3 is made of a magnetic substance that is attracted by a magnet, and is formed into a hat shape.

The hat-shaped hub 3 has a flattened cone-shape portion: the smaller-diameter side of which is closed, while the greater-diameter side is open. The hub 3 also has a brim portion 3b having a flange-shape extending from the edge of the opening on the greater-diameter side outward in the direction of the diameter.

On the upper and lower inner faces of the cartridge case 2, a pair of protrusions 4 are respectively installed so that they are aligned face to face with each other, in order to prevent the information area of the optical disk 1 from being damaged due to its contact against the inner face of the cartridge case 2. Additionally, in the present specification, the rotational-axis direction of the optical disk 1 stands for the vertical direction.

Here, the distance between the tips of the protrusions 4 in the rotational axis direction is set to be greater than the thickness of the information area of the optical disk 1. With this arrangement, the optical disk 1 is moved in the rotational-axis direction by the turntable (not shown) in such a manner that it is located apart from both of the protrusions 4; therefore, the optical disk 1 is rotated by the turntable without contacting any portion of the cartridge case 2.

The protrusions 4 are not necessarily limited in their shape as long as they can support the disk 1 while contacting the non-information area of the disk 1; for example, they are formed into a ring shape that is virtually coaxial with the through hole 2b.

The optical disk 1 is provided with a recessed section 1b to which the hub 3 is fit. The recessed section 1b is formed along the peripheral edge of the center hole 1a recessing toward the through hole 2b of the cartridge case 2. The recessed section 1b is coaxial with the central axis of the center hole 1a, and has a circular shape in its lalteral cross-section perpendicular to the central axis.

The depth of the recessed section 1b is set to be greater as compared with conventional arrangements. Here, the depth represents the length in the rotational-axis direction. Further, the hub 3 having the hat shape is set to be greater in its height than that of conventional arrangements. When the cartridge case 2 is placed in a virtually horizontal position with the through hole 2b facing down, the hub 3 is situated inside the recessed section 1b with its brim portion 3b contacting the bottom surface of the recessed section 1b. In this case, the hub 3 is kept in a fitted state, and is freely moved in the rotational-axis direction of the optical disk 1.

Further, in the area of the inner surface of the cartridge case 2 that faces the top portion of the hub 3, a restricting protrusion 5 is installed so that it restricts the movement of the hub 3. The restricting protrusion 5 is installed in a manner as to protrude from the inner surface of the cartridge case 2 toward the top portion of the hub 3.

With this arrangement, the restricting protrusion 5 restricts the movement of the hub 3 when the hub 3 moves upward and the top portion of the hub 3 comes into contact with the tip of the restricting protrusion 5; thus, the brim portion 3b is designed to always stay inside the recessed section 1b. In other words, the distance between the tip of the restricting protrusion 5 and the top portion of the hub 3 is set to be smaller than the depth of the recessed section 1b.

Moreover, the restricting protrusion 5 is designed in such a manner that when the optical disk 1 is moved in the rotational-axis direction and driven, the top portion of the hub 3, which is moved together with the optical disk 1, is kept apart from the restricting protrusion 5. Thus, the optical disk 1 is rotated without contacting the restricting protrusion 5.

Here, the restricting protrusion 5 is not necessarily limited in its shape and number: If installed as one unit, it may have a ring-shape that is coaxial with the rotational-axis of the optical disk 1, or it may have a virtual pillar-shape. If installed as plural units, they may respectively have a pillar-shape or a pipe-shape.

Additionally, in the case where a plurality of restricting protrusion 5 are installed, they are preferably designed so as to be symmetrical with respect to the rotational axis. This is to restrict the hub 3 from tilting against the rotational axis and to prevent the hub 3 from coming off from the recessed section 1b when the restricting protrusions 5 come into contact with the hub 3.

Here, since the cartridge case 2 is injection molded from plastic, the restricting protrusion 5 is formed simultaneously as the cartridge case 2 is made; therefore, the production of the restricting protrusion 5 is comparatively simple.

In accordance with the arrangement of embodiment 1, when the cartridge case 2 is inserted into, for example, a driver, the cartridge case 2 moves with respect to a turntable, not shown, in the rotational direction of the turntable, and the raised portion of the turntable is fitted to the center hole 1a. Since the raised portion has a flattened cone shape that is coaxial with the turntable, positioning is made so that the optical disk 1 is set to be coaxial with the turntable.

On the other hand, the turntable comes into contact with the clamping area 1c of the optical disk 1, and raises the optical disk 1 with respect to the cartridge case 2. The optical disk 1 is thus separated from the protrusions 4.

At this time, the magnet, which is attached to the top of the raised portion of the turntable, attracts the hub 3 toward the turntable, and the brim portion 3b of the hub 3 thus presses the optical disk 1 against the turntable, thereby clamping it onto the turntable.

Consequently, the optical disk 1 is driven to rotate by the turntable without contacting any portion of the cartridge case 2. Further, the restricting protrusion 5, installed on the inner face of the cartridge case 2, is kept apart from the top portion of the hub 3, and does not interrupt the rotation of the optical disk 1.

In conventional arrangements, in order to make the hub securely clamp the optical disk, the hub was fixed to the peripheral edge of the center hole of the optical disk by the use of a bonding material such as an adhesive or a double-sided tape. For this reason, it was necessary to provide a particular fixing process as well as further providing a particular device for fixing both of those members and bonding materials; this made the manufacturing cost quite high.

Here, in the arrangement of the present embodiment, without the necessity of fixing the hub 3 to the optical disk 1, the restricting protrusion 5 restricts the range of movement of the hub 3 in the rotational-axis direction; therefore, it is possible to prevent the hub 3 from coming off from the recessed section 1b, even if the cartridge case 2 is vertically placed, or is placed upside down.

Thus, in the above arrangement, when the cartridge case 2 is inserted into, for example, a driver, the hub 3 is always maintained inside the recessed section 1b while being kept in coaxial with the rotational axis of the optical disk 1; this ensures a secure clamp of the optical disk 1 by the hub 3.

Therefore, the assembly of the cartridge case 2 is simplified: The hub 3 need not be fixed to the optical disk 1; and after inserting the hub 3 into the recessed section 1b formed around the center hole 1a of the optical disk 1 while keeping it in coaxial with the rotational axis, the cartridge case 2 is assembled by putting the optical disk 1 into the case.

Since the arrangement of embodiment 1 makes it possible to eliminate bonding members and a particular device for use in fixing, which are needed in the conventional methods, the manufacturing cost can be reduced.

[EMBODIMENT 2]

The following description will discuss another embodiment of the present invention as embodiment 2. Here, for convenience of explanation, those members that have the same functions and that are described in embodiment 1 are indicated by the same reference numerals and the description thereof is omitted.

Figure 2:
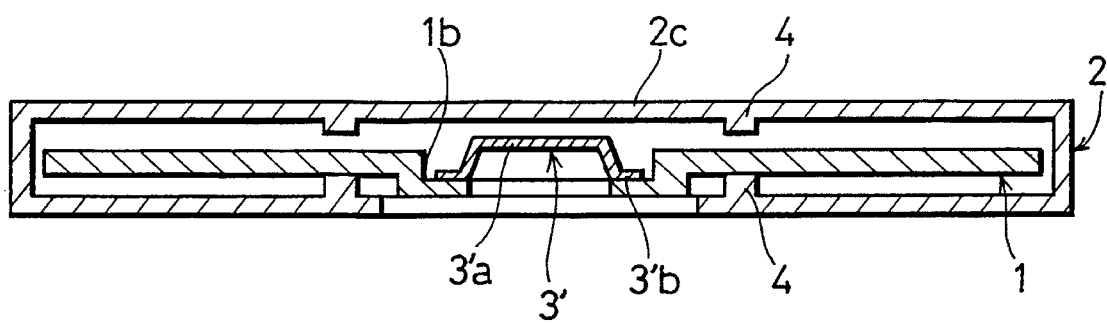
FIG. 2 is a cross-sectional view of a cartridge used for a disc-shaped recording medium that indicates another embodiment of the present invention.

A cartridge used for a disc-shaped recording medium, although it has virtually the same shape as that described in embodiment 1, is not provided with a restricting protrusion 5 to be installed on the cartridge case 2, and instead of the hub 3 shown in FIG. 1, it is provided with a hub 3' shown in FIG. 2.

The hub 3' is formed into a hat shape as in embodiment 1, and the height of the flattened cone-shape portion 3'a thereof is set to be even greater than that of the hub 3 shown in FIG. 1. That is, it is set to be greater than the distance between the optical disk 1 and the inner face of the upper shell 2c of the cartridge case 2. In other words, the depth of the recessed section 1b is set to be greater than the distance between the top portion of the flattened cone-shape portion 3'a and the inner face of the upper shell 2c.

With this arrangement, even if the hub 3' is moved upward and the top portion of the flattened cone-shape portion 3'a is brought into contact with the upper shell 2c, the circumferential edge of the brim portion 3'b of the hub 3' is kept within the circumferential wall of the recessed section 1b. This makes it possible to prevent the hub 3' from coming off from the recessed section 1b of the optical disk 1.

Therefore, in accordance with the arrangement of embodiment 2, as with that of embodiment 1, no matter what position the cartridge case 2 has been placed, the hub 3' is always maintained inside the recessed section 1b when the cartridge case 2 is inserted into, for example, a driver.

As with embodiment 1, since the arrangement of embodiment 2 makes it possible to eliminate a fixing process of the hub 3' and the optical disk 1, the manufacturing cost can be reduced.

[EMBODIMENT 3]

The following description will discuss another embodiment of the present invention as embodiment 3. Here, for convenience of explanation, those members that have the same functions and that are described in embodiment 1 are indicated by the same reference numerals and the description thereof is omitted.

Figure 3:
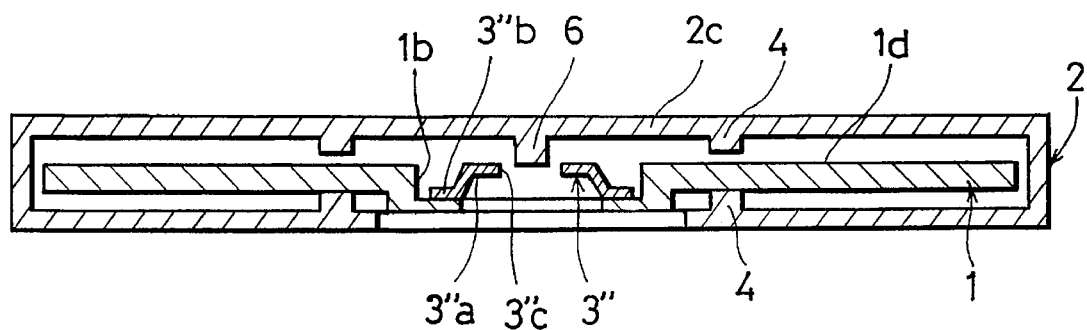
FIG. 3 is a cross-sectional view of a cartridge used for a disc-shaped recording medium that indicates the other embodiment of the present invention.
Figure 4:
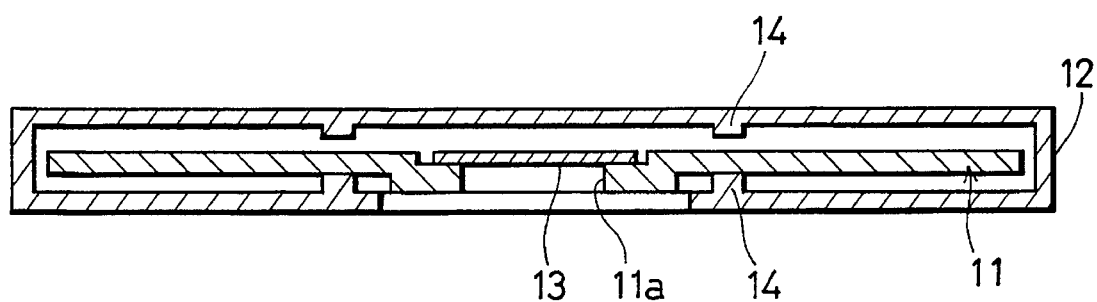
FIG. 4 is a cross-sectional view of a conventional optical disk cartridge.

A cartridge used for a disc-shaped recording medium, although it has virtually the same shape as that described in embodiment 1, is provided with a hub 3" shown in FIG. 3 instead of the hub 3 shown in FIG. 1, and instead of the restricting protrusion 5 of FIG. 1, it is provided with a projecting pin 6. Further, the hub 3" is provided with a central opening 3"c that is formed in the center of the top portion of the flattened-cone-shaped 3"a thereof.

The projecting pin 6 is formed on the inner face of the cartridge case 2 in a manner as to protrude toward the central opening 3"c in the rotational-axis direction of the optical disk 1. As the hub 3" moves in the rotational-axis direction of the optical disk 1, the projecting pin 6 is freely fit to and inserted into the central opening 3"c. The shape of the projecting pin 6 is not necessarily limited: for example, it may have a column shape or a square pillar.

With this arrangement, even if the cartridge case 2 is vertically placed, or is placed upside down causing the hub 3" to move toward the upper shell 2c, the tip of the projecting pin 6 is fit to and inserted into the central opening 3"c. Thus, the movement of the hub 3" in the direction perpendicular to the rotational axis is stopped by the engagement between the projecting pin 6 and the central opening 3"c.

Consequently, when the cartridge case 2 is returned to a virtually horizontal position, in such a position as to be inserted into, for example, a driver, the hub 3" is guided by the projecting pin 6 and readily returned to its predetermined position inside the recessed section 1b.

Therefore, in accordance with the arrangement of embodiment 3, as with that of embodiment 1, no matter what position the cartridge case 2 has been placed, the hub 3" is always maintained inside the recessed section 1b when the cartridge case 2 is inserted into, for example, a driver.

As with embodiment 1, since the arrangement of embodiment 3 makes it possible to eliminate a fixing process between the hub 3" and the optical disk 1, the manufacturing cost can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cartridge used for a disc-shaped recording medium comprising:

a recording medium which is shaped into a disc having a center hole for use in positioning and a recessed section formed around the center hole;

a clamping plate formed into a hat shape having a flat brim for clamping the recording medium by the use of magnetic force, the flat brim having a top and bottom surface and an outer edge surface perpendicular to the top and bottom surfaces that forms an outermost edge surface of the clamping plate the flat brim extending outwardly in a radial direction, the clamping plate being placed in the recessed section so that, the outermost edge surface is located totally in the recessed section and is completely surrounded by a wall of the recessed section, with the total area of the bottom surface in direct physical contact with the recessed section, a part of the recording medium being sandwiched between the bottom surface and a turntable that is inserted into the center hole; and a case for housing the recording medium and the clamping plate so as to permit them to freely rotate therein, the case being provided with a through hole which allows the turntable to be removably inserted therein, wherein the recessed section is formed into a shape that is recessed toward the through hole and houses the clamping plate so as to permit it to move therein, the clamping plate being provided with a height dimension in a rotational-axis direction of the recording medium that is set to be greater than the distance between the recording medium and the inner surface of the case.

2. The cartridge used for a disc-shaped recording medium as defined in claim 1, wherein the recording medium further comprises:

the center hole being coaxial with the rotational axis of the recording medium, the recessed section being provided along the peripheral edge of the center hole.

3. The cartridge used for a disc-shaped recording medium as defined in claim 2, wherein the recessed section is coaxial with the central axis of the center hole, the recessed section having a circular shape in the lateral cross-section thereof that is perpendicular to the central axis.

4. The cartridge used for a disc-shaped recording medium as defined in claim 1, wherein the clamping plate is a hub.

5. The cartridge used for a disc-shaped recording medium as defined in claim 1, wherein the recording medium is an optical disc.

6. The cartridge used for a disc-shaped recording medium as defined in claim 1, wherein the recording medium is a magneto-optical disc.

7. The cartridge used for a disc-shaped recording medium as defined in claim 1, wherein the clamping plate is made of a magnetic material.

8. The cartridge used for a disc-shaped recording medium as claimed in claim 1, wherein the height dimension includes a center of the clamping plate.

9. A cartridge used for a disc-shaped recording medium comprising:

a recording medium which is shaped into a disc having a center hole for positioning and a recessed section, a clamping plate for clamping the recording medium by the use of magnetic force, the clamping plate shaped so that it has a flattened cone shaped portion, which has a greater-diameter portion that has an open end and a smaller-diameter portion, and a brim portion having a flange-shape that extends from the open end of the greater-diameter portion outward in the direction of the diameter, the brim portion having an upper surface and a bottom surface, said clamping plate being placed in the recessed section, one portion of the recording medium being sandwiched between the bottom surface and a turntable that is inserted into the center hole; and a case, for housing the recording medium and the clamping plate so as to permit them to freely rotate therein, the case being provided with a through hole in a bottom plate, which allows the turntable to be removably inserted therein, and a restricting protrusion attached to a top portion of the case coming into contact with the clamping plate when the clamping plate moves in the recessed section thereby preventing the clamping plate from coming off from the recessed section;

wherein the recessed section is formed into a shape that is recessed toward the through hole and houses the clamping plate so as to permit it to move therein, the clamping plate being provided with a height dimension in a rotational-axis direction of the recording medium that is set to be greater than the distance between the recording medium and the inner surface of the case.

10. The cartridge used for a disc-shaped recording medium as defined in claim 9 wherein at least either the restricting protrusion or the clamping plate is designed so that the distance between the tip of the restricting protrusion and the clamping plate is smaller than the depth of the recessed section.

11. The cartridge used for a disc-shaped recording medium as defined in claim 9, wherein the restricting protrusion is formed in a manner as to protrude toward the clamping plate from an inner surface of the case, thereby restricting the range of movement of the clamping plate by contacting the clamping plate when it is moved.

12. The cartridge used for a disc-shaped recording medium as defined in claim 11, wherein the restricting protrusion has a ring shape.

13. The cartridge used for a disc-shaped recording medium as defined in claim 12, wherein the restricting protrusion is coaxial with the rotational axis of the recording medium.

14. The cartridge used for a disc-shaped recording medium as claimed in claim 9, wherein the flange-shape is flat.

15. A cartridge used for a disc-shaped recording medium comprising:

a recording medium which is shaped into a disc having a center hole for use in positioning and a recessed section;

a clamping plate for clamping the recording medium by the use of magnetic force, the clamping plate being placed in the recessed section, a part of the recording medium being sandwiched between the clamping plate and a turntable that is inserted into the center hole; and a case for housing the recording medium and the clamping plate so as to permit them to freely rotate therein, the case being provided with a through hole which allows the turntable to be removably inserted therein, and with a stopping member protruding toward the clamping plate secured to and extending perpendicular from a top of the case solely in a direction toward a bottom of the case, the clamping plate being provided with a through engagement hole wherein the stopping member is freely inserted into the through engagement hole, only when the recording medium has shifted in a rotational axis direction and the clamping plate moves from a first position, which is a position where the recording medium is allowed to freely rotate by action of the turntable, to a second position in the recessed section, the through engagement hole being designed in such a manner that the movement of the clamping plate is restricted in a direction perpendicular to the rotational-axis direction of the recording medium when the stopping member is inserted into the through engagement hole, wherein the recessed section is formed into a shape that is recessed toward the through hole and houses the clamping plate so as to permit it to move therein, the clamping plate being provided with a height dimension in the rotational-axis direction of the recording medium that is set to be greater than the distance between the recording medium and the inner surface of the case.

16. The cartridge used for a disc-shaped recording medium as defined in claim 15, wherein the stopping member is a projecting pin that is coaxial with the rotational axis.

17. The cartridge used for a disc-shaped recording medium as defined in claim 15, wherein the through engagement hole is a central opening that is formed virtually in the center of the clamping plate.

18. The cartridge used for a disc-shaped recording medium as claimed in claim 15, wherein the height dimension includes a center of the clamping plate and the clamping plate includes a flat brim.

19. A cartridge used for a disc-shaped recording medium comprising:

a recording medium which is shaped into a disc having a center hole for use in positioning and a recessed section formed around the center hole;

a clamping plate for clamping the recording medium by the use of magnetic force, the clamping plate being placed in the recessed section so that an outer portion of the clamping plate is surrounded by a wall of the recessed section, the clamping plate having a flattened cone shape having a first diameter portion and a second diameter portion that is greater than the first diameter portion, the second diameter portion having an open end, and a brim portion having a flange-shape that extends from an edge of the open end of the second diameter portion, the brim portion having an upper surface and a bottom surface, a part of the recording medium being sandwiched between the bottom surface and a turntable that is inserted into the center hole; and a case for housing the recording medium and the clamping plate so as to permit them to freely rotate therein, the case being provided with a through hole which allows the turntable to be removably inserted therein, wherein the recessed section is formed into a shape that is recessed toward the through hole and houses the clamping plate so as to permit it to move therein, the clamping plate being provided with a height dimension in a rotational-axis direction of the recording medium that is set to be greater than the distance between the recording medium and the inner surface of the case.

20. The cartridge used for a disc-shaped recording medium as defined in claim 19, wherein the brim portion has an outer edge surface that forms an outer most edge surface of the clamping plate.

21. The cartridge used for a disc-shaped recording medium as claimed in claim 19, wherein the open end of the clamping plate is directly adjacent the center hole.

22. The cartridge used for a disc-shaped recording medium as claimed in claim 19, wherein the flange-shape is flat.

* * * * *